United States Patent [19]
Pleuss

[11] 4,190,377
[45] Feb. 26, 1980

[54] ADJUSTABLE COLUMN

[75] Inventor: Mark E. Pleuss, Manitowoc, Wis.

[73] Assignee: American Hospital Supply Corporation, Evanston, Ill.

[21] Appl. No.: 882,077

[22] Filed: Mar. 1, 1978

[51] Int. Cl.$^2$ .............................................. F16B 7/14
[52] U.S. Cl. ..................................... 403/108; 403/327
[58] Field of Search ............... 403/108, 110, 326, 327, 403/322

[56] References Cited
U.S. PATENT DOCUMENTS

| | | | |
|---|---|---|---|
| 1,055,201 | 3/1913 | Mason | 248/222.2 |
| 2,546,299 | 3/1951 | DuMais et al. | 403/108 X |
| 4,080,080 | 3/1978 | Cisler | 403/108 |

Primary Examiner—Wayne L. Shedd
Attorney, Agent, or Firm—Larry N. Barger

[57] ABSTRACT

An adjustable column with a pair of telescopically coupled members with a spring biased latch on an inner member which selectively engages notches along a longitudinal slot in the outer member. A manually tightenable lock secures the members together in a direction approximately parallel to the latch's movement. The lock also includes the protruding head to act as a pushbutton for disengaging the latch.

15 Claims, 5 Drawing Figures

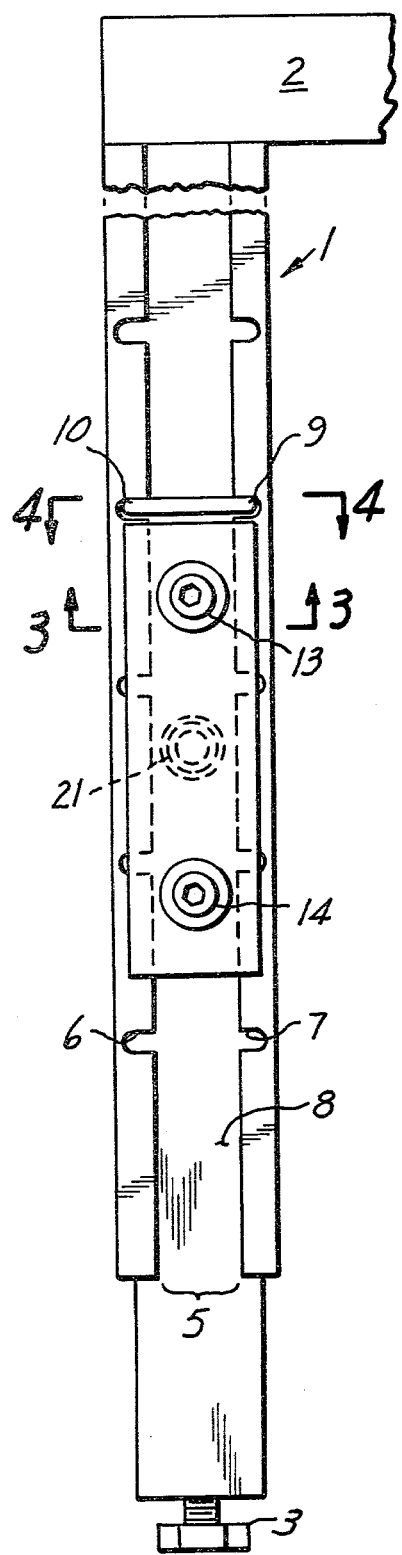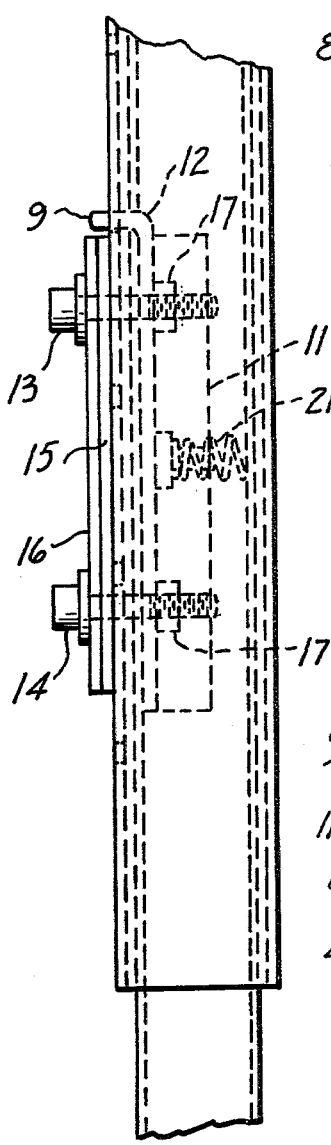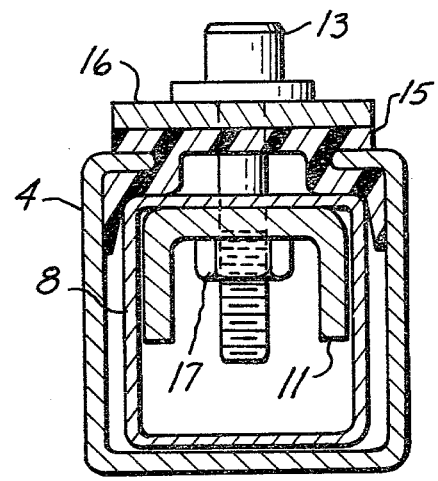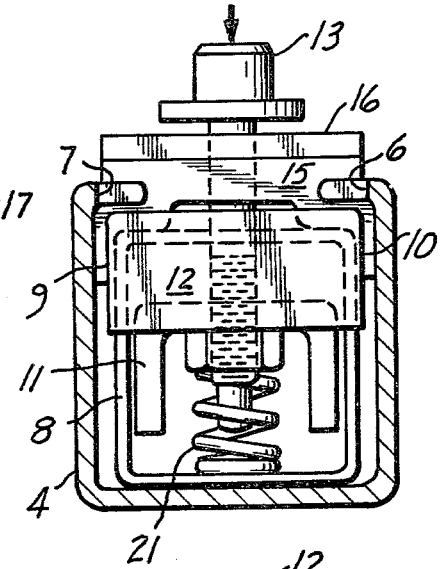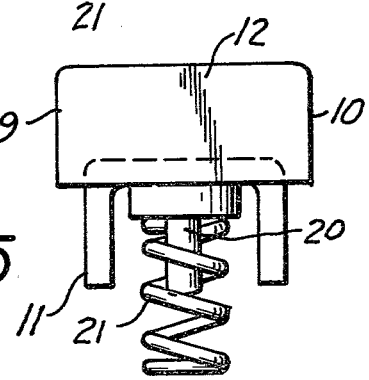

ADJUSTABLE COLUMN

BACKGROUND

It is known to use a telescoping structure to vary the length of a longitudinal member, such as a table leg or the like. U.S. Pat. No. 2,831,739 describes an adjustable telescopic leg in which a spring biased bullet latch secured to an outer member selectively engages one of a series of longitudinally spaced holes in an inner member to adjust the length of the table leg. These bullet-type latches generally include a spring biased, bullet shaped post with a rounded forward end adapted to slide along a member and snap into a round hole in such member. Because of the tolerance or "slop" necessary for the functioning of bullet-type latches, such latches do not firmly grip the two members together. When used in a telescoping leg, there is a certain amount of wobble at the bullet latch.

It has also been proposed to combine a bullet-type latch with a threaded locking structure located at a right angle to the bullet latch's axis of travel. This is described in patent application Ser. No. 769,050, by Earl J. Cisler. That application, now U.S. Pat. No. 4,080,080, has a common assignee with the present application. In Ser. No. 769,050, it was discovered that inherent manufacturing tolerances caused a binding action on the bullet latch requiring very large or elongated holes for receiving the bullet latch. A very large oversize hole decreased the accuracy of length control, and the laterally elongated hole was expensive and tedious to machine.

SUMMARY OF THE INVENTION

The present invention overcomes the above problems in firmly securing an adjustable leg at a particular length setting. This invention includes a laterally movable latch combined with a manually tightenable lock that secures the members together in a direction approximately parallel to the latch's movement. Telescoping leg members must have some space between them to permit free sliding. The adjacent walls of the inner and outer members are grippingly pulled together to firmly lock them. Such movement does not bind the latch because it is approximately parallel to the latch's movement. In the structure shown, the lock in the form of a threaded fastener is supported on the latch and protrudes as a pushbutton for disengaging the latch from a particular support.

THE DRAWINGS

FIG. 1 is a fragmentary elevational view of the adjustable leg from the rear or adjustment side;

FIG. 2 is a fragmentary right side elevational view of FIG. 1;

FIG. 3 is an enlarged sectional view taken along line 3—3 of FIG. 1 showing the lock securing the inner and outer members together;

FIG. 4 is an enlarged sectional view taken along line 4—4 (but rotated 180°) and showing the lock member pushing back the latch structure; and FIG. 5 is an enlarged top view of the latch assembly of FIG. 2, the view being rotated 90°.

DETAILED DESCRIPTION

FIG. 1 shows an adjustable leg indicated generally as 1, which is attached to a table top 2. A height adjustment screw 3 can be provided at a bottom of leg 1, if desired.

Leg 1 includes an outer generally C-shaped member 4 which can be of a generally rectangular shape having a longitudinl slot 5. Spaced along opposite sides of this slot are a series of longitudinally spaced notches 6 and 7. Telescoped within outer member 4 is an inner member 8, which is perferably square. A pair of protruding ears 9 and 10 on a latch structure secured to a top end of inner member 8 protrude through a pair of opposed notches in outer member 4. This prevents longitudinal telescopic motion between the inner and outer members and sets the leg length.

The latch structure can include a U-shaped channel 11 shown in dotted line in FIG. 2. An upper end of this channel is provided with a flange 12 which is an integral part of the laterally protruding ears 9 and 10. A pair of threaded fasteners 13 and 14 lock the latch 11 firmly against the inner member and draw such inner member into tight contact with the outer member. This firmly blocks the adjustable leg against wobble and causes ears 9 and 10 to engage into a specific pair of opposed notches. Preferably there is a resilient member 15 between an outer metal plate 16 and an outer surface of the outer member to prevent scratching and damaging paint, etc. on this outer member. As shown in FIG. 3, resilient member 15 also extends inside outer member 4 and acts as a compression spacer between such outer member and inner member 8.

In FIG. 3, the U-shaped body 11 of the latch member is shown welded to one of two threaded nut members 17, both of which are shown in FIG. 2. As threaded fasteners 13 and 14 are tightened, inner member 8, latch 11, resilient member 15, outer member 4 and plate 16 are drawn together along the axis of threaded fasteners 13 and 14.

When it is desired to change the adjustable leg to a different length setting, threaded fasteners 13 and 14 are partially unscrewed, causing them to retract from metal plate 16. Threaded fastener 13 can then act as a pushbutton and a manually applied force causes the latch 11 to move rearwardly in the inner member 8. Flange 12 with its laterally protruding ears 9 and 10 are thereby retracted from engagement with the notches of the outer member 4.

FIG. 5 shows the U-shaped latch structure which has a spring support post 20 on which is supported a compression spring 21. This spring contacts the rear wall of the inner member 8 and urges the latch in a forward direction so its ears 9 and 10 protrude from their particular notches. Thus, when threaded fastener 13 is pushed as in FIG. 4, this pressure then compresses spring 21 when ears 9 and 10 are disengaged from their particular notches.

In the foregoing description, a specific example has been used to describe the invention. However, it is understood by those skilled in the art that certain modifications can be made to this example without departing from the spirit and scope of the invention.

I claim:

1. An adjustable column including a pair of telescopically coupled longitudinal members with a laterally movable latch on one member that selectively engages spaced supports on the other member to adjust the column's length, wherein the improvement comprises: a manually tightenable lock supported on the latch, which lock secures the members together in a direction approximately parallel to the latch's movement.

2. An adjustable column as set forth in claim 1, wherein the latch is spring biased.

3. An adjustable column as set forth in claim 1, wherein the lock is connected to and supported by the latch.

4. An adjustable column as set forth in claim 3, wherein the lock is a threaded fastener forming an actuating handle for the latch.

5. An adjustable column as set forth in claim 1, wherein one member includes a generally C-shaped channel with a longitudinal slot and the supports are shoulder surfaces of notches in the channel along its slot.

6. An adjustable column as set forth in claim 5, wherein the generally C-shaped channel is an outer member with the other member being telescoped inside.

7. An adjustable column as set forth in claim 6, wherein the latch fits inside the inner member and includes a protruding ear to selectively engage the notches of the outer member.

8. An adjustable column as set forth in claim 6, wherein the generally C-shaped channel has a row of opposed notches along each side of its slot, and the latch has a pair of ears which engage opposed slots.

9. An adjustable column as set forth in claim 6, wherein the latch is spring biased to force the ear outward into such notch.

10. An adjustable column as set forth in claim 9, wherein the latch includes a post supporting a spring.

11. An adjustable column as set forth in claim 1, wherein the members have a resilient element that is squeezed between the members as the lock is tightened.

12. An adjustable column as set forth in claim 1, wherein the latch includes a threaded support element and the lock includes a threaded fastener secured to such support element and having a protruding head to act as a pushbutton to disengage the latch from its support on the other member.

13. An adjustable column as set forth in claim 12, wherein the latch is spring biased.

14. An adjustable column as set forth in claim 1, wherein the latch is a generally U-shaped channel with an external flange at one end which includes a pair of ears proturding laterally from such flange.

15. An adjustable column including a pair of telescopically coupled longitudinal members with a latch, wherein the improvement comprises: longitudinally spaced supports along a longitudinal slot in one member; a laterally movable latch secured to the other member and having a protruding ear for selectively engaging said supports; and a lock supported on the latch and having a protruding head to act as a pushbutton for disengaging the ear from a support in a direction generally parallel to the lock movement; and said lock including thread means for grippingly securing the two members together when the ear is at a support providing the column with its desired length.

* * * * *